US011867936B2

(12) United States Patent
Yoon et al.

(10) Patent No.: US 11,867,936 B2
(45) Date of Patent: Jan. 9, 2024

(54) LAMINATE FILM

(71) Applicant: LG CHEM, LTD., Seoul (KR)

(72) Inventors: Hyuk Yoon, Daejeon (KR); Sin Young Kim, Daejeon (KR); Eun Soo Huh, Daejeon (KR); Ji Youn Lee, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 541 days.

(21) Appl. No.: 17/262,661

(22) PCT Filed: Nov. 4, 2019

(86) PCT No.: PCT/KR2019/014798
§ 371 (c)(1),
(2) Date: Jan. 22, 2021

(87) PCT Pub. No.: WO2020/091549
PCT Pub. Date: May 7, 2020

(65) Prior Publication Data
US 2021/0165149 A1 Jun. 3, 2021

(30) Foreign Application Priority Data
Nov. 2, 2018 (KR) .................. 10-2018-0133682

(51) Int. Cl.
*G02B 5/30* (2006.01)
*C09D 7/65* (2018.01)
(Continued)

(52) U.S. Cl.
CPC .......... *G02B 5/3016* (2013.01); *C08J 7/0427* (2020.01); *C09D 7/65* (2018.01); *C09D 135/02* (2013.01);
(Continued)

(58) Field of Classification Search
CPC ............. C08F 222/24; C09K 19/3497; C09K 2019/0448; C09K 2323/035; G02B 1/04;
(Continued)

(56) References Cited

U.S. PATENT DOCUMENTS

2009/0085019 A1* 4/2009 Buhler ................ C08K 5/3475
252/589
2015/0234106 A1 8/2015 Nakamura et al.
(Continued)

FOREIGN PATENT DOCUMENTS

CN 101228461 A 7/2008
CN 112639000 B * 9/2023 ........... G02B 5/3016
(Continued)

OTHER PUBLICATIONS

International Search Report from PCT/KR2019/014798, dated Feb. 11, 2020.
(Continued)

*Primary Examiner* — Sophie Hon
(74) *Attorney, Agent, or Firm* — Bryan Cave Leighton Paisner LLP

(57) ABSTRACT

A laminate film comprising a retardation layer exhibiting blocking characteristics against specific ultraviolet rays even in a state where the retardation layer does not include any ultraviolet absorber or light stabilizer. The laminate film which can be used alone or in combination with an appropriate sunscreen or a light stabilizer as needed to selectively block ultraviolet rays in a region requiring blocking, without affecting display performance, such as color senses and image quality, of a display device. The laminate film can also be formed with a lower thickness without requiring a separate ultraviolet blocking layer, and also has excellent durability, because the laminate film exhibits a certain
(Continued)

ultraviolet blocking property even in the absence of an ultraviolet absorber or light stabilizer.

10 Claims, 5 Drawing Sheets

(51) Int. Cl.
    *C09D 135/02*      (2006.01)
    *C09K 19/38*      (2006.01)
    *C08J 7/04*      (2020.01)
    *C09K 19/34*      (2006.01)
    *G02B 1/04*      (2006.01)
    *C09K 19/04*      (2006.01)

(52) U.S. Cl.
    CPC ...... *C09K 19/3497* (2013.01); *C09K 19/3823* (2013.01); *C09K 19/3861* (2013.01); *G02B 1/04* (2013.01); *C08J 2400/12* (2013.01); *C08J 2467/03* (2013.01); *C09K 2019/0448* (2013.01); *C09K 2219/03* (2013.01); *C09K 2323/035* (2020.08)

(58) Field of Classification Search
    CPC . G02B 5/3083; G02B 5/3016; G02F 1/13363; G02F 1/133528; C08L 101/12
    See application file for complete search history.

(56) References Cited

U.S. PATENT DOCUMENTS

2018/0002460 A1*    1/2018    Endo .................... C08F 2/48
2019/0264106 A1     8/2019    Takahashi et al.

FOREIGN PATENT DOCUMENTS

| | | | |
|---|---|---|---|
| EP | 3345939 A1 | 7/2018 | |
| JP | 2014533376 A | 12/2014 | |
| JP | 7205980 B2 * | 1/2023 | ............ C08J 5/18 |
| KR | 10-2010-0072038 A | 6/2010 | |
| KR | 10-2015-0116160 A | 10/2015 | |
| KR | 10-2016-0051506 A | 5/2016 | |
| KR | 10-2018-0048837 A | 5/2018 | |
| KR | 10-2019-0006455 A | 1/2019 | |
| KR | 10-2019-0006458 A | 1/2019 | |
| KR | 102318724 B1 * | 10/2021 | .......... G02B 5/3016 |
| TW | 1719700 B * | 2/2021 | .......... G02F 1/1335 |
| WO | 2016114253 A1 | 7/2016 | |
| WO | 2016114255 A1 | 7/2016 | |
| WO | 2018101196 A1 | 6/2018 | |
| WO | 2018173778 A1 | 9/2018 | |

OTHER PUBLICATIONS

Written Opinion of the ISA from PCT/KR2019/014798, dated Feb. 11, 2020.
Office Action of Japanese Patent Office in Appl'n No. 2021-504398, dated Jun. 13, 2022.
Office Action of Chinese Patent Office in Appl'n No. 201980053232.4, dated Jul. 27, 2022.
Office Action of Chinese Patent Office in Appl'n No. 201980053232.4, dated Feb. 22, 2023.

* cited by examiner

[Figure 1]
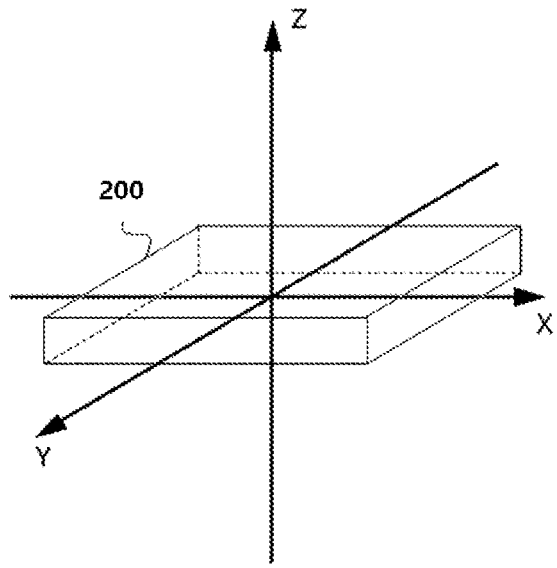
[Figure 2]
[Figure 3]
[Figure 4]

[Figure 5]
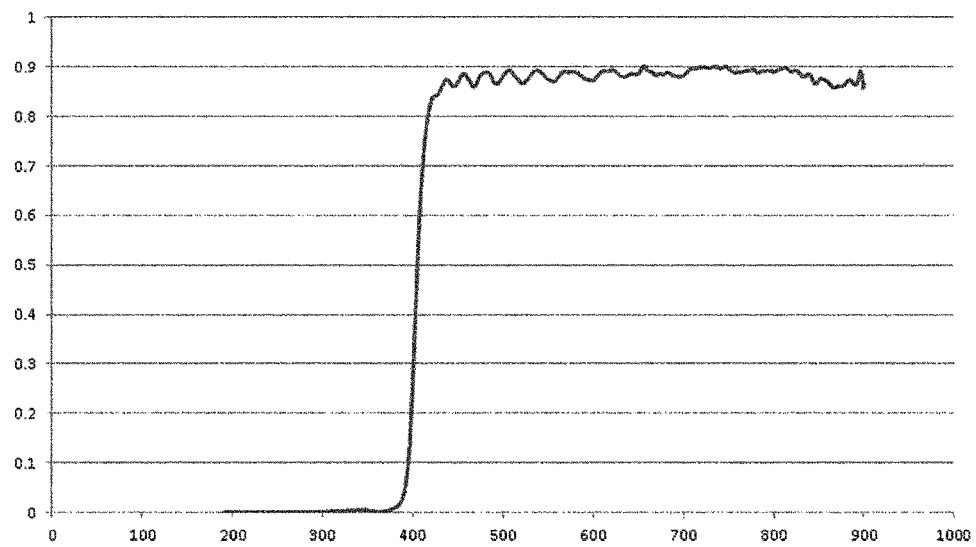
[Figure 6]
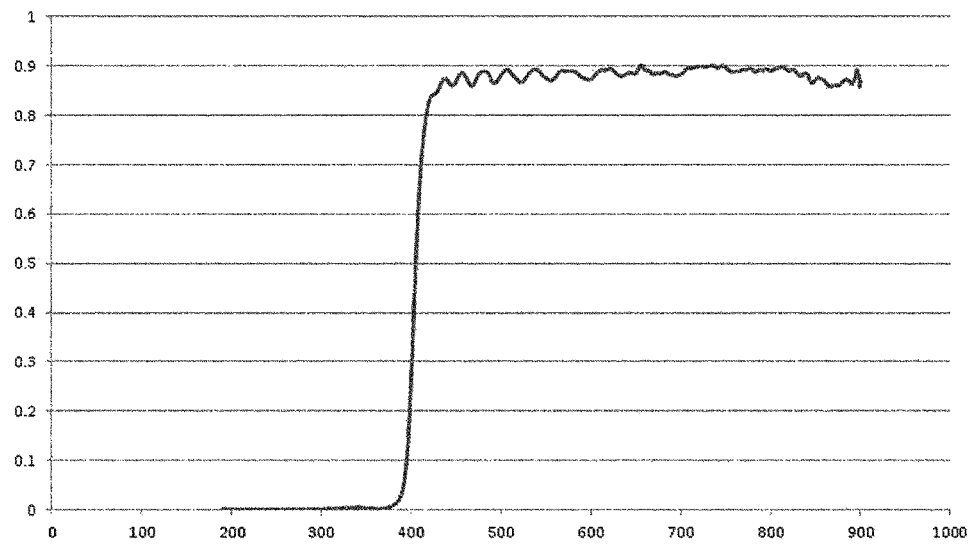

[Figure 7]
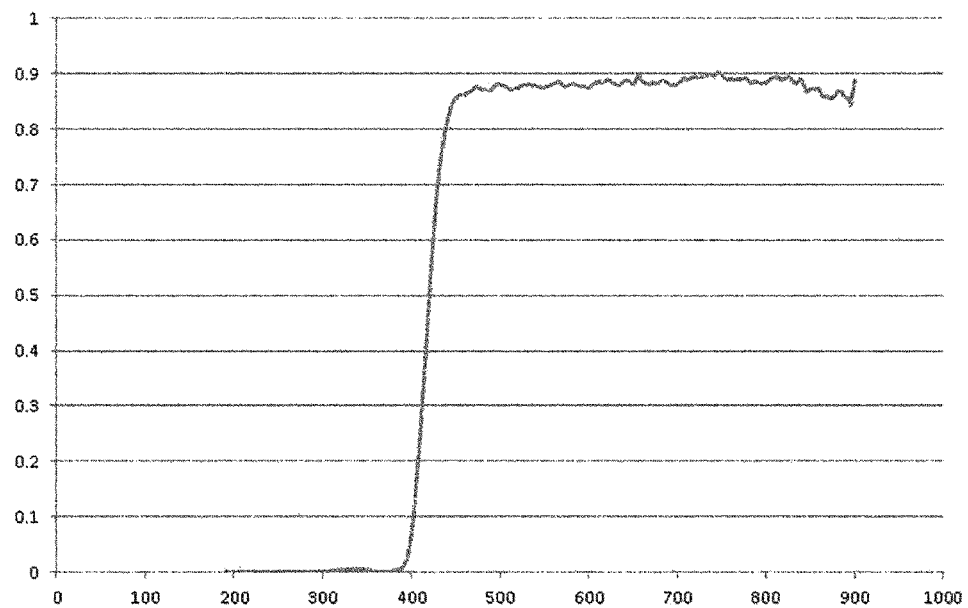
[Figure 8]
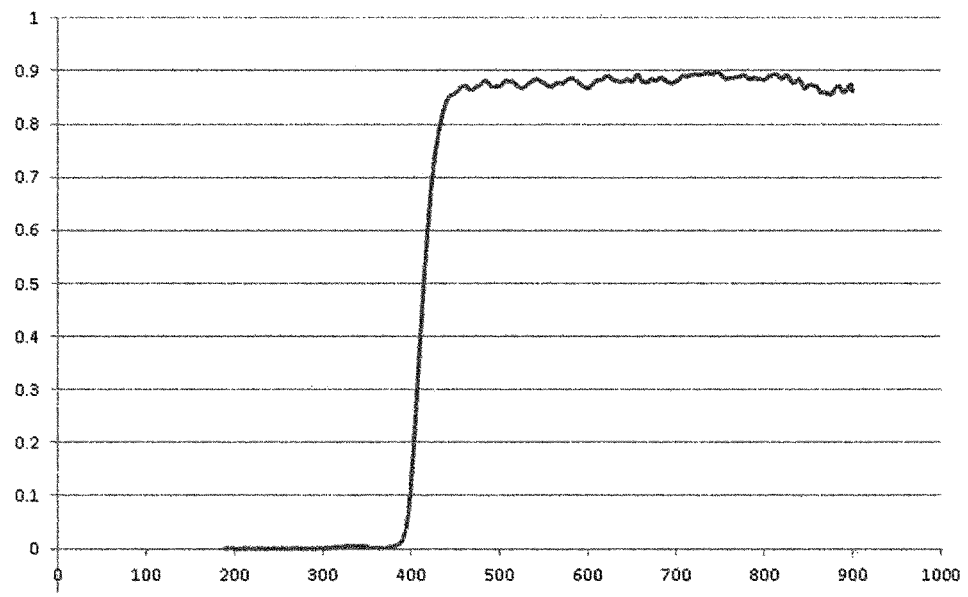

[Figure 9]
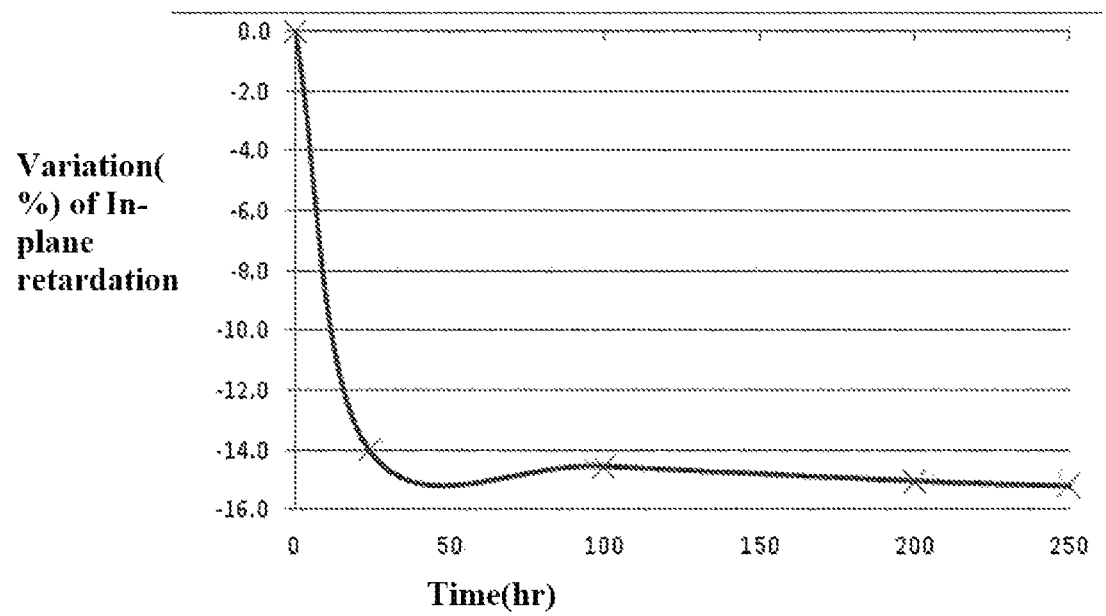
[Figure 10]
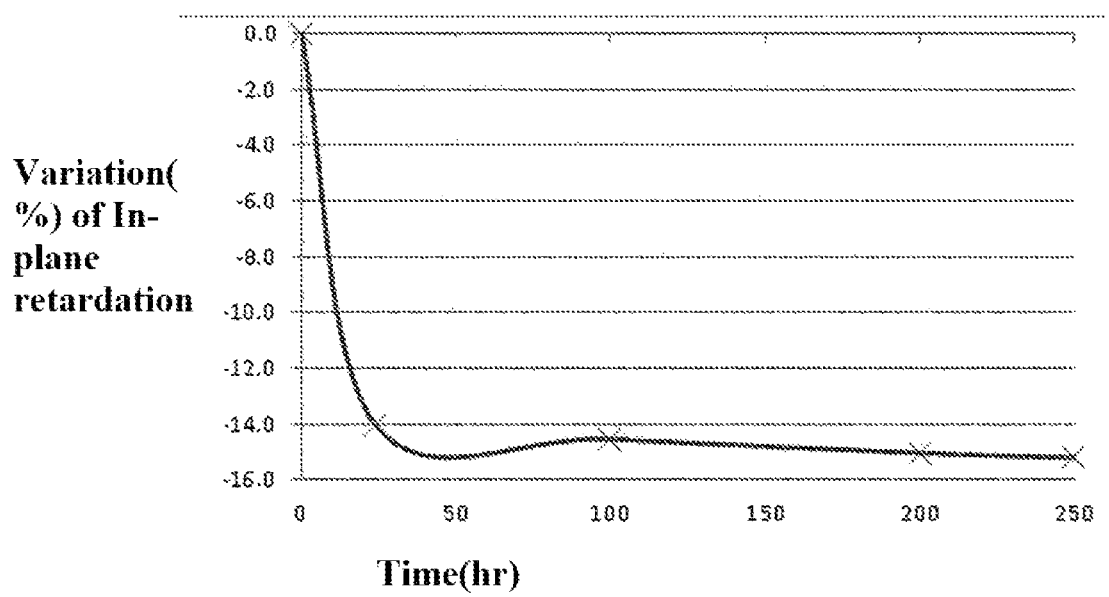

[Figure 11]
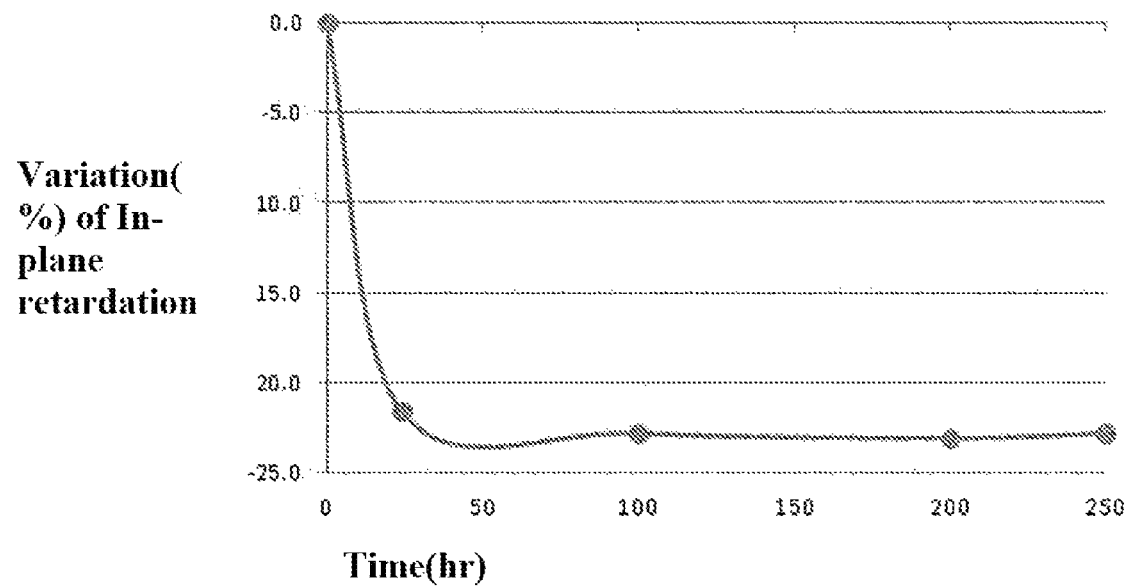
[Figure 12]
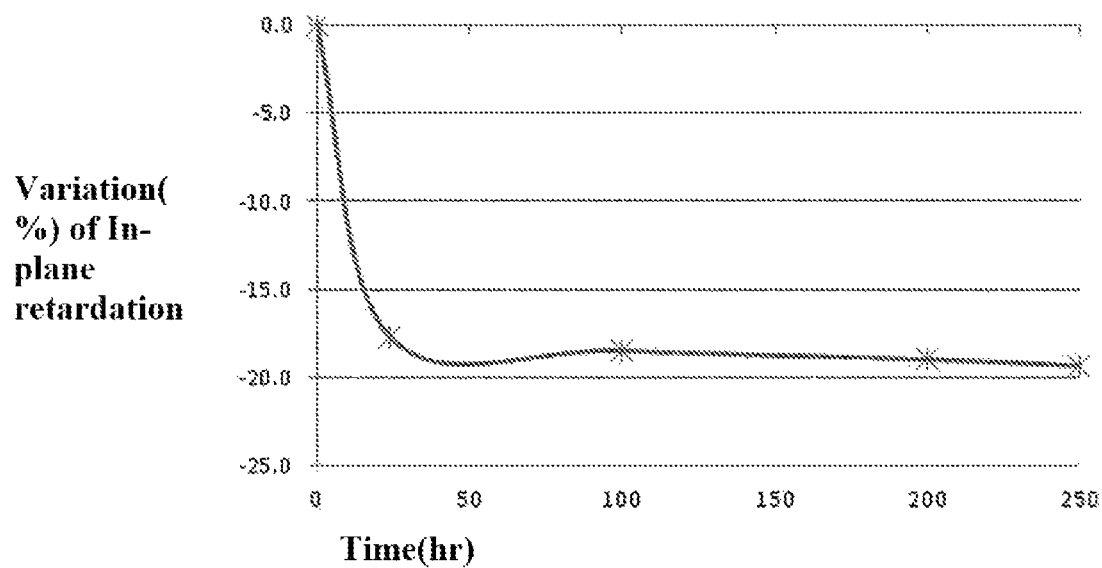

LAMINATE FILM

CROSS-REFERENCE TO RELATED APPLICATIONS

This application is a U.S. national stage of international Application No. PCT/KR2019/014798 filed on Nov. 4, 2019, and claims priority based on Korean Patent Application No. 10-2018-0133682 filed on Nov. 2, 2018, the disclosures of which are incorporated herein by reference in their entirety.

TECHNICAL FIELD

The present application relates to a laminate film.

BACKGROUND ART

In many cases, optical films included in display devices require ultraviolet blocking properties for durability and protection of display elements, and the like. For this reason, ultraviolet absorbers or light stabilizers are introduced into many optical films.

Commercially available ultraviolet absorbers or light stabilizers can effectively block ultraviolet rays with a wavelength of less than approximately 380 nm, but the blocking efficiency against ultraviolet rays having a wavelength of 380 nm or more is lowered. In addition, although ultraviolet absorbers or light stabilizers capable of partially blocking or absorbing ultraviolet rays having a wavelength of 380 nm or more are known, such ultraviolet absorbers or light stabilizers absorb or block short wavelengths belonging to the visible light region as well, and thus also absorb or block a portion of the visible light region displayed in the display device, thereby adversely affecting image quality such as color senses.

Since the ultraviolet absorber or light stabilizer is an additive, there may be a problem when it is blended into an optical film. For example, when a polymerizable liquid crystal compound (RM: reactive mesogen) is polymerized in an orientation that produces a retardation layer, blending the ultraviolet absorber or light stabilizer into the relevant layer may reduce the orientation of the liquid crystal compound. Since most of the polymerizable liquid crystal compounds are ultraviolet polymerizable, they are irradiated with ultraviolet rays during the manufacturing process, where if the ultraviolet absorber or light stabilizer is present, the polymerization may not be performed properly, thereby adversely affecting durability and optical properties.

SUMMARY

The present application relates to a laminate film. It is one object of the present application to provide a laminate film comprising a retardation layer exhibiting blocking characteristics against specific ultraviolet rays even in a state where the retardation layer does not include any ultraviolet absorber or light stabilizer. In addition, it is another object of the present application to provide a laminate film which can be used alone or in combination with an appropriate sunscreen or a light stabilizer as needed to selectively block ultraviolet rays in a region requiring blocking, without affecting display performance, such as color senses and image quality, of a display device, can also be formed thinly without requiring a separate ultraviolet blocking layer, and also has excellent durability, because the laminate film exhibits a certain ultraviolet blocking property even in the absence of an ultraviolet absorber or light stabilizer.

BRIEF DESCRIPTION OF DRAWINGS

FIG. 1 is a schematic illustration for explaining a slow axis, a fast axis and a thickness direction of a retardation layer.

FIGS. 2 to 4 are schematic illustrations of exemplary laminate films of the present application.

FIGS. 5 to 8 are graphical representations of the ultraviolet absorption characteristics of Examples or Comparative Examples.

FIGS. 9 to 12 are graphical representations of the retardation changes of Examples or Comparative Examples.

DETAILED DESCRIPTION

Unless otherwise specified, retardation and refractive indexes mentioned in this specification are numerical values derived from light having a wavelength of 550 nm as a reference wavelength.

An exemplary laminate film may comprise a base film and a retardation layer formed on one side of the base film. The retardation layer comprises a polymerized unit of a normal wavelength dispersion polymerizable liquid crystal compound and a polymerized unit of a reverse wavelength dispersion polymerizable liquid crystal compound, and the retardation layer has ultraviolet absorptivity that transmittance for light having a wavelength of 385 nm is 3% or less. Another layer does not exist between the base film and the retardation layer formed on one side thereof and the retardation layer may be formed in contact with the base film, or another layer may also exist between the base film and the retardation layer.

The base film may also be a base film applied together with a retardation layer when the laminate film is applied to a display device or the like, and in another example, it may also be a carrier film. In the case of the carrier film, the retardation layer may be formed on the retardation layer to be peelable from the base film, and when applied to the display device, the base film may also be peeled off and removed.

As the base film, various films may be applied. For example, a glass film or a plastic film may be applied. As the plastic film, a polyolefin film such as a polyethylene film or a polypropylene film, a cycloolefin polymer (COP) film such as a polynorbornene film, a polyvinyl chloride film, a polyacrylonitrile film, a polysulfone film, an acryl resin film, a polycarbonate film, a polyester film such as a polyethylene terephthalate film, a polyacrylate film, a polyvinyl alcohol film or a cellulose ester-based polymer film such as a TAC (triacetyl cellulose) film, or a polymer film comprising a copolymer of two or more of monomers forming the above polymers. Among them, a polymer film comprising a copolymer or the like of two or more monomers among monomers forming the polymers, and the like may be used.

The thickness of the base film is also not particularly limited, which may be selected in an appropriate range.

The retardation layer formed on the base film is designed to have controlled optical properties at light in the ultraviolet region, particularly, any wavelength in a range of 380 nm to 400 nm or wavelengths within a certain range in the range of 380 nm to 400 nm. In the present application, the retardation layer is designed such that it can selectively block the ultraviolet region of specific wavelengths without applying an additive such as an ultraviolet absorber or a light stabilizer.

The laminate film of the present application can ensure stability and durability by itself, while selectively and effectively blocking ultraviolet rays affecting durability, and can also be applied to a display device to maintain excellent display quality.

In the present application, the retardation layer itself has a blocking ability or an absorbing ability with respect to ultraviolet rays in a predetermined wavelength range. For example, the retardation layer may have transmittance for light having a wavelength of 385 nm, 390 nm, 395 nm and/or 400 nm in a predetermined range.

The retardation layer may have transmittance of 3% or less for light having a wavelength of 385 nm. In another example, the transmittance may be 2.9% or less, 2.8% or less, 2.7% or less, 2.6% or less, 2.5% or less, 2.4% or less, 2.3% or less, 2.2% or less, 2.1% or less, 2.0% or less, 1.9% or less, 1.8% or less, 1.7% or less, 1.6% or less, 1.5% or less, or 1.4% or less. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1.0% or more, 1.1% or more, 1.2% or more, 1.3% or more, 1.4% or more, 1.5% or more, 1.6% or more, or 1.65% or more.

The retardation layer may have transmittance of 15% or less for light having a wavelength of 390 nm. In another example, the transmittance may be 14% or less, 13% or less, 12% or less, 11% or less, 10% or less, 9% or less, 8% or less, 7% or less, 6% or less, 5% or less, 4% or less, or 3.5% or less. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1% or more, 1.5% or more, 2% or more, 2.5% or more, 2.6% or more, 2.7% or more, 2.8% or more, 2.9% or more, 3.1% or more, 3.2% or more, 3.3% or more, 3.4% or more, 3.5% or more, or 3.6% or more.

The retardation layer may have transmittance of 25% or less for light having a wavelength of 395 nm. In another example, the transmittance may be 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, or 3.5% or less. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, or 9.5% or more.

The retardation layer may have transmittance of 40% or less for light having a wavelength of 400 nm. In another example, the transmittance may be 39.5% or less, 39% or less, 38.5% or less, 38% or less, 37.5% or less, 37% or less, 36.5% or less, 36% or less, 35.5% or less, 35% or less, or 34.5% or less, 34% or less, 33.5% or less, 33% or less, 32.5% or less, 32% or less, 31.5% or less, 31% or less, 30% or less, 29.5% or less, 29% or less, 28.5% or less, 28% or less, 27.5% or less, or 27% or less or so. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, 14% or more, 14.5% or more, 15% or more, 15.5% or more, 16% or more, 16.5% or more, 17% or more, 17.5% or more, 18% or more, 18.5% or more, 19% or more, 19.5% or more, 20% or more, 20.5% or more, 21% or more, 21.5% or more, 22% or more, 22.5% or more, 23% or more, 23.5% or more, 24% or more, 24.5% or more, or 25% or more or so.

The transmittance of the retardation layer can be measured using, for example, a spectrometer (N&K analyzer, N&K Technologies, INC). The transmittance of the retardation layer can be measured after the relevant retardation layer is positioned on a film which substantially exhibits no absorption peak at a wavelength of 380 nm or more, where a liquid crystal alignment film or the like may also be present between the film and the retardation layer, or may not be present. Here, the fact that the film substantially exhibits no absorption peak at a wavelength of 380 nm or more may mean that the transmittance of light having wavelengths of, for example, 385 nm, 390 nm and 400 nm is 90% or more, respectively. In another example, the transmittance may be approximately 90% to 95% and the like. Such a film includes, for example, an NRT (no retardation TAC (triacetyl cellulose)), Fuji Corporation) film or a TAC (triacetyl cellulose) film, and the like, but is not limited thereto.

For example, after placing the retardation layer on such a film and then setting the air as the baseline, the transmittance can be calculated following measurement of each transmittance in a state of being vertically and horizontally aligned with the slow axis which is the reference axis of the retardation layer.

The retardation layer having the transmittance characteristics designed as above can ensure that the laminate film has stability and durability while exhibiting a blocking property for light having a wavelength in the range of 380 to 400 nm.

In the present application, the ultraviolet blocking ability of the retardation layer as above can be realized without introducing an ultraviolet absorber or a light stabilizer, and the like into the retardation layer separately. Therefore, in one example, the retardation layer may not include an ultraviolet absorber or a light stabilizer, for example, an ultraviolet absorber or a light stabilizer, having a maximum absorption wavelength in the range of 380 nm to 400 nm. That is, when the retardation layer is constituted by suitably combining a normal wavelength dispersion polymerizable liquid crystal compound and a reverse wavelength dispersion polymerizable liquid crystal compound as described below, the structural characteristics of the individual polymerizable liquid crystal compounds are complementary to each other, whereby the desired ultraviolet absorptivity can be ensured without applying an ultraviolet absorber or a light stabilizer and the like. By applying no ultraviolet absorber and light stabilizer in this way, it is possible to form a retardation layer having excellent durability that does not cause poor orientation of liquid crystals by the addition of additives or a bleeding-out phenomenon after formation of the retardation layer, and the like.

In one example, the retardation layer having the ultraviolet blocking ability can be realized by designing a reverse wavelength dispersion characteristic in the same manner as described below.

The retardation layer may be a layer having a refractive index relationship according to any one of the following equations 1 to 3:

$$nx>ny=nz;\qquad\text{[Equation 1]}$$

$$nx>ny>nz;\qquad\text{[Equation 2]}$$

$$nx>ny \text{ and } nz>ny.\qquad\text{[Equation 3]}$$

In Equations 1 to 3, nx, ny and nz are the refractive index in the x-axis direction (slow axis direction), the refractive index in the y-axis direction (fast axis direction) and the refractive index in the z-axis direction, respectively, and such definitions may be equally applied in this specification, unless otherwise specified. Here, as illustrated in FIG. 1, the x-axis direction may mean, for example, a direction parallel to the in-plane slow axis direction of the retardation layer (200) in the form of a film or sheet, the y-axis direction may mean an in-plane direction (fast axis direction) perpendicular to the x-axis, and the z-axis direction may mean a normal direction, for example, a thickness direction of the plane formed by the x-axis and the y-axis.

The retardation layer included in the circularly polarizing plate may have, for example, in-plane retardation within a range capable of having a quarter-wave phase delay characteristic. In this specification, the term n-wave phase delay characteristic means a characteristic that the incident light can be phase-delayed by n times the wavelength of the incident light within at least a part of the wavelength range. The quarter-wave phase delay characteristic may be a characteristic that the incident linearly polarized light is converted into elliptically polarized light or circularly polarized light and conversely, the incident linearly polarized light or circularly polarized light is converted into linearly polarized light. In one example, the retardation layer may have in-plane retardation for light having a wavelength of 550 nm in a range of 90 nm to 300 nm. In another example, the in-plane retardation may be 100 nm or more, 105 nm or more, 110 nm or more, 115 nm or more, 120 nm or more, 125 nm or more, or 130 nm or more. In addition, the in-plane retardation may be 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, or 145 nm or less.

In this specification, the term in-plane retardation is a value determined according to Equation 4 below, and the thickness direction retardation is a value determined according to Equation 5 below:

$$Rin=d\times(nx-ny);\qquad\text{[Equation 4]}$$

$$Rth=d\times(nz-ny).\qquad\text{[Equation 5]}$$

In Equations 4 and 5, Rin is in-plane retardation, Rth is thickness direction retardation, nx, ny, and nz are as defined in Equations 1 to 3 above, and d is the thickness of the retardation layer.

For the retardation layer, the range of the thickness direction retardation obtained according to Equation 5 above is not particularly limited, which may be, for example, in a range of about −200 nm to 200 nm. In another example, the thickness direction retardation may be −190 nm or more, −180 nm or more, −170 nm or more, −160 nm or more, −150 nm or more, −140 nm or more, −130 nm or more, −120 nm or more, −110 nm or more, −100 nm or more, −90 nm or more, −80 nm or more, −70 nm or more, −60 nm or more, −50 nm or more, −40 nm or more, −30 nm or more, −20 nm or more, or −10 nm or more. Also, in another example, the thickness direction retardation may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 10 nm or less.

The retardation layer may be a layer having so-called reverse wavelength dispersion characteristics. In this specification, the reverse wavelength dispersion characteristic may be a characteristic satisfying Equation 6 below:

$$R(450)/R(550)<R(650)/R(550).\qquad\text{[Equation 6]}$$

In Equation 6, R (450) is the in-plane retardation of the retardation layer for light having a wavelength of 450 nm, R (550) is the in-plane retardation of the retardation layer for light having a wavelength of 550 nm, and R (650) is the in-plane retardation of the retardation layer for light having a wavelength of 650 nm.

The in-plane retardation may each be calculated according to Equation 4 above. However, the values of nx and ny applied in Equation 4 are the refractive indexes for light having a wavelength of 450 nm when calculating the in-plane retardation for light having a wavelength of 450 nm; the values nx and ny in Equation 4 are the refractive indexes for light having a wavelength of 550 nm when calculating the in-plane retardation for light having a wavelength of 550 nm; and as the values of nx and ny applied in Equation 4 are the refractive indexes for light having a wavelength of 650 nm when calculating the in-plane retardation for light having a wavelength of 650 nm.

The retardation layer satisfying Equation 6 may exhibit phase delay characteristics designed in a wide wavelength range.

By adjusting R (450)/R (550) and/or R (650)/R (550) of Equation 6 in the retardation layer, it is possible to provide a better effect. In one example, R (450)/R (550) in Equation 6 above may be in a range of 0.6 to 0.99. In another example, R (450)/R (550) may be 0.61 or more, 0.62 or more, 0.63 or more, 0.64 or more, 0.65 or more, 0.66 or more, 0.67 or more, 0.69 or more, 0.70 or more, 0.71 or more, 0.72 or more, 0.73 or more, 0.74 or more, 0.75 or more, 0.76 or more, 0.77 or more, 0.78 or more, 0.79 or more, 0.80 or more, 0.81 or more, 0.82 or more, 0.83 or more, 0.84 or more, 0.85 or more, 0.86 or more, 0.87 or more, 0.88 or more, 0.89 or more, or 0.90 or more. In another example, the R (450)/R (550) may be 0.98 or less, 0.97 or less, 0.96 or less, 0.95 or less, 0.94 or less, 0.93 or less, 0.92 or less, 0.91 or less, 0.90 or less, 0.89 or less, 0.88 or less, 0.87 or less, 0.86 or less, or 0.85 or less. R (650)/R (550) in Equation 6 may be in a range of 1.00 to 1.19. The R (650)/R (550) may be 1.18 or less, 1.17 or less, 1.16 or less, 1.15 or less, 1.14 or less, 1.13 or less, 1.12 or less, 1.11 or less, 1.1 or less, or 1.08 or less or so. In another example, R (650)/R (550) in Equation 6 may be 1.01 or more, 1.02 or more, 1.03 or more, 1.04 or more, 1.05 or more, 1.06 or more, 1.07 or more, 1.08 or more, or 1.09 or more.

The method of adjusting R (450)/R (550) and/or R (650)/R (550) of the retardation layer to the above range is not particularly limited, but in the present application it can be realized by using two polymerizable liquid crystal compounds having different reverse wavelength dispersion characteristics as above, as described below, to secure the desired ultraviolet blocking ability even if the ultraviolet absorber or light stabilizer is not included.

It is advantageous to apply a liquid crystal polymer layer or a cured layer of a polymerizable liquid crystal composition as a retardation layer to secure the desired transmittance characteristic in the above-mentioned wavelength range, and particularly, it is advantageous to apply a cured layer of a polymerizable liquid crystal composition comprising a polymerizable liquid crystal compound having a specific reverse wavelength dispersion characteristic.

The retardation layer may comprise at least a polymerized unit of a normal wavelength dispersion polymerizable liquid crystal compound to be described below and a polymerization unit of a reverse wavelength dispersion polymerizable liquid crystal compound to be also described below. Here, the polymerized unit means a unit formed by polymerizing or curing the respective polymerizable liquid crystal compounds, as described below.

For example, in the present application, a retardation layer can be manufactured by mixing two or more polymerizable liquid crystal compounds so as to satisfy Equation 6 above, and for example, a polymerizable liquid crystal compound having a low value of R (450)/R (550) (for example, a reverse wavelength dispersion polymerizable liquid crystal compound as described below) and a polymerizable liquid crystal compound having a high value of R (450)/R (550) (for example, a normal wavelength dispersion polymerizable liquid crystal compound as described below) can be combined to satisfy Equation 6 above.

In this specification, the term "polymerizable liquid crystal compound" may mean a compound containing a moiety capable of exhibiting liquid crystallinity, such as a mesogen skeleton, and also containing one or more polymerizable functional groups. Such polymerizable liquid crystal compounds are variously known under the so-called RM (reactive mesogen). The polymerizable liquid crystal compound may be contained in the polymerized form in the cured layer, that is, the above-described polymerized unit, which may mean a state where the liquid crystal compound is polymerized to form skeletons of the liquid crystal polymer such as main chains or side chains in the cured layer.

The polymerizable liquid crystal compound may be a monofunctional or multifunctional polymerizable liquid crystal compound. Here, the monofunctional polymerizable liquid crystal compound may be a compound having one polymerizable functional group and the multifunctional polymerizable liquid crystal compound may mean a compound containing two or more polymerizable functional groups. In one example, the polyfunctional polymerizable liquid crystal compound may comprise 2 to 10, 2 to 8, 2 to 6, 2 to 5, 2 to 4, 2 to 3, or 2 or 3 polymerizable functional groups.

It is known that a polymerizable liquid crystal composition prepared by combining the polymerizable liquid crystal compound with other components such as an initiator, a stabilizer and/or a non-polymerizable liquid crystal compound is cured in a state where it is oriented on an alignment film to form the cured layer expressing birefringence, and in the present application, the above-mentioned transmittance characteristics can be secured by controlling the properties of the polymerizable liquid crystal compound used in such a known process.

In order to secure the above-described transmittance characteristics, it is advantageous that the cured layer of the polymerizable liquid crystal composition comprising the reverse wavelength dispersion polymerizable liquid crystal compound is applied. Here, the reverse wavelength dispersion polymerizable liquid crystal compound means a polymerizable liquid crystal compound in which the liquid crystal layer (cured layer) formed by curing the polymerizable liquid crystal compound alone exhibits reverse wavelength dispersion characteristics, where the reverse wavelength dispersion characteristics mean the properties described Equation 6 above.

In the present application, among the reverse wavelength dispersion polymerizable liquid crystal compounds, particularly, a liquid crystal compound having R (450)/R (550) of Equation 6 in a range of 0.6 to 0.99 can be applied. In another example, R (450)/R (550) of the reverse wavelength dispersion polymerizable liquid crystal compound may be 0.61 or more, 0.62 or more, 0.63 or more, 0.64 or more, 0.65 or more, 0.66 or more, 0.67 or more, 0.69 or more, 0.70 or more, 0.71 or more, 0.72 or more, 0.73 or more, 0.74 or more, 0.75 or more, 0.76 or more, 0.77 or more, 0.78 or more, 0.79 or more, 0.80 or more, 0.81 or more, 0.82 or more, 0.83 or more, 0.84 or more, 0.85 or more, 0.86 or more, 0.87 or more, 0.88 or more, 0.89 or more, or 0.90 or more. In another example, the R (450)/R (550) may be 0.98 or less, 0.97 or less, 0.96 or less, 0.95 or less, 0.94 or less, 0.93 or less, 0.92 or less, 0.91 or less, 0.90 or less, 0.89 or less, 0.88 or less, 0.87 or less, 0.86 or less, or 0.85 or less. Also, the reverse wavelength dispersion polymerizable liquid crystal compound may have R (650)/R (550) of Equation 6 in a range of 1.00 to 1.19. The R (650)/R (550) may be 1.18 or less, 1.17 or less, 1.16 or less, 1.15 or less, 1.14 or less, 1.13 or less, 1.12 or less, 1.11 or less, 1.1 or less, or 0.08 or less or so. In another example, the R (650)/R (550) may be 1.01 or more, 1.02 or more, 1.03 or more, 1.04 or more, 1.05 or more, 1.06 or more, 1.07 or more, 1.08 or more, or 1.09 or more or so. Among various known polymerizable liquid crystal compounds, particularly, in the case of the polymerizable liquid crystal compounds having R (450)/R (550) values in the above-mentioned range, it has been confirmed that the above-described transmittance characteristics are effectively satisfied by red shift of the UV absorption wavelength region when it is combined with the normal wavelength dispersion polymerizable liquid crystal compound, as described below. In one example, the R (450)/R (550) may also be 0.6 or more, 0.61 or more, 0.62 or more, 0.63 or more, 0.64 or more, 0.65 or more, 0.66 or more, 0.67 or more, 0.68 or more, 0.69 or more, 0.70 or more, 0.71 or more, 0.72 or more, 0.73 or more, 0.74 or more, 0.75 or more, 0.76 or more, 0.77 or more, or 0.78 or more.

It is determined that this phenomenon is due to the inherent molecular structure of the reverse wavelength dispersion polymerizable liquid crystal compound designed to have R (450)/R (550) in the above range.

The birefringence of the polymerizable liquid crystal compound is known to be mainly determined by a molecular conjugation structure, differential oscillator strength and order parameters, and the like. In order for the polymerizable liquid crystal compound to exhibit high birefringence, large electron density in the direction of the main axis is required, and thus most of the polymerizable liquid crystal compounds have a highly conjugated shape in the long axis direction.

In order for the polymerizable liquid crystal compound to exhibit the reverse wavelength dispersion property, it is necessary to adjust the birefringence between the long axis and the axis perpendicular thereto. Accordingly, the polymerizable liquid crystal compound designed to have the reverse wavelength dispersion property has mostly a molecular shape in the form of a T or an H and simultaneously is a shape that the main axis (long axis) has a large retardation and a small dispersion value, and the axis perpendicular thereto has a small retardation and a large dispersion value.

However, since the electronic transition ($\pi \rightarrow \pi^*$) that absorbs light in the range of 180 nm to 400 nm shifts to a longer wavelength as the conjugation length becomes longer, the polymerizable liquid crystal compound designed to have the reverse wavelength dispersion characteristic highly conjugates the negative birefringent portion to cause a red shift phenomenon in which the ultraviolet absorption wavelength region is shifted to a longer wavelength.

It has been confirmed that among the reverse wavelength dispersion polymerizable liquid crystal compounds having the above characteristics, particularly, the polymerizable liquid crystal compound designed so that the range of R (450)/R (550) is in the above-mentioned range exhibits the appropriate range of red shift capable of satisfying the transmittance characteristics required in the present application.

In particular, in the case of the reverse wavelength dispersion polymerizable liquid crystal compound having the following structure represented by Formula I, it has been confirmed that while it exhibits the desired ultraviolet blocking ability when it has been mixed with the normal wavelength dispersion polymerizable liquid crystal compound, its retardation properties (R (450)/R (550) and R (650)/R (550)) can also be effectively designed according to the purpose:

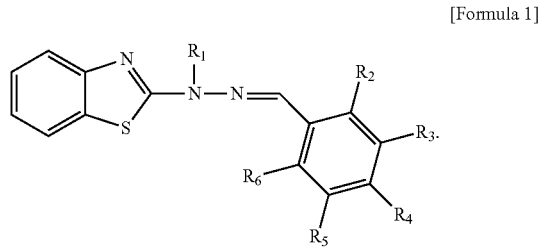

[Formula 1]

In Formula 1, $R_1$ is a substituent of the following Formula 2 or 3, and $R_2$ to $R_6$ are each independently hydrogen, an alkyl group, an alkoxy group, a cyano group, a substituent of the following Formula 4 or a substituent of the following Formula 5. Here, at least two or more or two of $R_2$ to $R_6$ are also substituents of the following Formula 4 or substituents of the following Formula 5.

For example, in Formula 1, any one of $R_2$ and $R_3$ and any one of $R_5$ and $R_6$ may be a substituent of the following Formula 4 or 5.

-$A_1$-$L_1$-Cyc-$A_2$-$L_2$-P. [Formula 2]

In Formula 2, $A_1$ and $A_2$ are each independently an oxygen atom or a single bond, $L_1$ and $L_2$ are each independently —C(=O)—O—, —O—C(=O)— or an alkylene group, Cyc is an arylene group or a cycloalkylene group, and P is a polymerizable functional group.

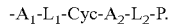

[Formula 3]

In Formula 3, $L_3$ and $L_4$ are each an alkylene group, n is a number in a range of 1 to 4, and P is a polymerizable functional group or a hydrogen atom.

-$A_3$-$L_5$-Cyc-$A_4$-$L_6$-P. [Formula 4]

In Formula 4, $A_3$ and $A_4$ are an oxygen atom, an alkylene group or a single bond, $L_5$ and $L_6$ are each independently —C(=O)—O—, —O—C(=O)— or an alkylene group, Cyc is an arylene group, and P is a polymerizable functional group.

-$A_5$-$L_7$-$Cy_1$-$A_6$-$Cy_2$-$A_7$-$L_9$-P. [Formula 5]

In Formula 5, $A_5$, $A_6$ and $A_7$ are each independently an oxygen atom or a single bond, $L_7$, $L_8$ and $L_9$ are each independently —C(=O)—O—, —O—C(=O)— or an alkylene group, $Cy_1$ is a cycloalkylene group, $Cy_2$ is an arylene group, and P is a polymerizable functional group.

In Formulas 1 to 5, the term single bond is a case where there is no separate atom at the corresponding site. For example, if $A_2$ in Formula 2 is a single bond, there is no separate atom in $A_2$ and a structure in which Cyc is directly connected to $L_2$ can be implemented.

In Formulas 1 to 5, the term alkyl group, alkoxy group or alkylene group may be a linear or branched alkyl group, alkoxy group or alkylene group, having 1 to 20 carbon atoms, 1 to 16 carbon atoms, 1 to 12 carbon atoms, 1 to 8 carbon atoms, or 1 to 4 carbon atoms, which may optionally be substituted by one or more substituents.

In Formulas 1 to 5, the arylene group may be an arylene group having 6 to 12 carbon atoms or may be a phenylene group.

In Formulas 1 to 5, the cycloalkylene group may be a cycloalkylene group having 3 to 12 carbon atoms or 3 to 9 carbon atoms, or may be a cyclohexylene group.

In the substituents of Formula 2, $A_1$ may be a single bond, $L_1$ may be —C(=O)—O— or —O—C(=O)—, $A_2$ may be an oxygen atom, and $L_2$ may be an alkylene group having 3 or more, 4 or more, or 5 or more carbon atoms. The carbon number of the alkylene group in $L_2$ may be 12 or less, or 8 or less.

In one example of Formula 3, $L_3$ and $L_4$ may each independently be an alkylene group having 1 to 4 carbon atoms, n may be a number in a range of 1 to 3 or a number in a range of 1 to 2, or may be 2, and P may be a polymerizable functional group. Also, in this case, when the number of units of [O-$L_4$] in Formula 3 is 2 or more, the carbon number of the alkylene group of $L_4$ in each unit may be the same or different.

In another example of Formula 3, $L_3$ and $L_4$ may each independently be an alkylene group having 1 to 4 carbon atoms, n may be a number in a range of 1 to 3 or a number in a range of 1 to 2, or may be 2, and P may be a hydrogen atom. Furthermore, in this case, when the number of units of [O-$L_4$] in Formula 3 is 2 or more, the carbon number of the alkylene group of $L_4$ in each unit may be the same or different.

In Formula 4, $A_3$ may be a single bond or may be an alkylene group having 1 to 4 carbon atoms, $L_5$ may be —C(=O)—O— or —O—C(=O)—, $A_4$ may be an oxygen atom, $L_6$ may be an alkylene group having 3 or more, 4 or more, or 5 or more carbon atoms. The carbon number of the alkylene group in $L_6$ may be 12 or less or 8 or less.

In Formula 5, $A_5$ may be an oxygen atom, $L_7$ may be an alkylene group having 1 to 4 carbon atoms, $A_6$ may be a single bond, $L_8$ may be —C(=O)—O— or —O—C(=O)—, $A_7$ may be an oxygen atom, and $L_9$ may be an alkylene group having 3 or more, 4 or more, or 5 or more carbon atoms. The carbon number of the alkylene group in $L_9$ may be 12 or less, or 8 or less.

It has been confirmed that the polymerizable liquid crystal compound can effectively satisfy the desired physical properties by a unique T type structure and a conjugated structure realized by centering on N—N bonds.

In the above formulas, the kind of the polymerizable functional group is not particularly limited, which may be, for example, an acryloyl group, a methacryloyl group, an acryloyloxy group or a methacryloyloxy group.

In one example, it may be advantageous that as the reverse wavelength dispersion polymerizable liquid crystal compound, a compound, wherein, in Formula 1 above, $R_1$ is a substituent of Formula 3 above, and at least two or more or two of $R_2$ to $R_6$ are substituents of Formula 5 above, is used.

If necessary, a liquid crystal compound that $R_1$ in Formula 1 above is a substituent of Formula 3 above, wherein P is a polymerizable functional group, and a liquid crystal compound that $R_1$ in Formula 1 above is a substituent of Formula 3 above, wherein P is a hydrogen atom, can be mixed and used, and in this case, the mixing ratio is determined according to the desired reverse wavelength dispersion characteristics (R (450)/R (550) and/or R (650)/R (550)), which is not particularly limited.

The polymerized units of the reverse wavelength dispersion polymerizable liquid crystal compound may be contained in the cured layer (liquid crystal layer) in a ratio of 40 wt % or more based on the weight of the polymerized units of the entire polymerizable liquid crystal compound. In another example, the ratio may also be about 45 wt % or more, 50 wt % or more, 55 wt % or more, 60 wt % or more, 65 wt % or more, 70 wt % or more, 75 wt % or more, 80 wt % or more, 85 wt % or more, 80 wt % or more, or 95 wt % or more. The retardation layer (liquid crystal layer) may contain only polymerized units of the liquid crystal compound of the Formula 1 above as the polymerizable liquid crystal compound, but for realizing appropriate physical properties, it is advantageous that the normal wavelength dispersion polymerizable liquid crystal compound to be described below is contained with the polymerizable liquid crystal compound of Formula 1. Accordingly, the ratio may be 100 wt % or less or less than 100 wt %.

The polymerizable liquid crystal composition and/or the cured layer (liquid crystal layer) may further comprise, in addition to the reverse wavelength dispersion polymerizable liquid crystal compound, a polymerizable liquid crystal compound in which in Equation 1, R (450)/R (550) is in a range of 1.04 to 1.25, 1.04 to 1.15 or 1.06 to 1.15 (hereinafter, normal wavelength dispersion polymerizable liquid crystal compound). The application of the reverse wavelength dispersion polymerizable liquid crystal compound having the above-mentioned R (450)/R (550) is advantageous in that the cured layer (liquid crystal layer) exhibits the desired transmittance characteristics, but it is disadvantageous that as the value of R (450)/R (550) is somewhat low, the cured layer (liquid crystal layer) exhibits a reverse wavelength dispersion characteristic as a whole. Therefore, in order to overcome this disadvantage, the polymerizable liquid crystal compound having the R (450)/R (550) value in the above range may be added in the polymerizable liquid crystal composition and/or the cured layer to control the overall optical properties. The normal wavelength dispersion liquid crystal compound may have R (650)/R (550) of Equation 6 in a range of about 0.8 to 0.99, about 0.85 to 0.99, about 0.9 to 0.99, or about 0.91 to 0.99.

Such normal wavelength dispersion polymerizable liquid crystal compounds are variously known. As the normal wavelength dispersion polymerizable liquid crystal compound, various known materials can be used, but in order to secure the desired physical properties by complementing miscibility with the previously described reverse wavelength dispersion polymerizable liquid crystal compound or ultraviolet absorptivity of the reverse wavelength dispersion polymerizable liquid crystal compound, it may be advantageous to use a compound represented by the following Formula 6:

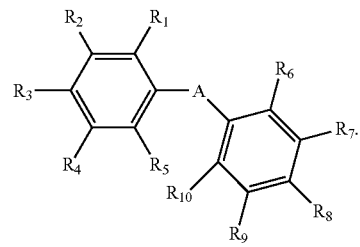
[Formula 6]

In Formula 6, A may be a single bond, —C(=O)O— or —OC(=O)— and $R_1$ to $R_{10}$ may each independently be hydrogen, halogen, an alkyl group, an alkoxy group, an alkoxycarbonyl group, a cyano group, a nitro group or a substituent of Formula 7 below. Also, in another example, two neighboring substituents of $R_1$ to $R_5$ or two neighboring substituents of $R_6$ to $R_{10}$ in the structure may be bonded to each other to constitute a benzene ring substituted with -L'-A'-P'. For example, when two neighboring substituents of $R_1$ to $R_5$ form benzene substituted with -L'-A'-P', a naphthalene structure substituted with -L'-A'-P' can be realized on the left side based on A in Formula 6 above, and when two neighboring substituents of $R_6$ to $R_{10}$ form benzene substituted with -L'-A'-P', a naphthalene structure substituted with -L'-A'-P' can be realized on the right side based on A in Formula 6 above. Here, L' may be —C(=O)O—, —OC(=O)— or —OC(=O)O—, A' may be an alkylene group, and P' may be a polymerizable functional group. Here, the alkylene of A' may be an alkylene group having 1 or more, 2 or more, 3 or more, or 4 or more carbon atoms, and the carbon number of the alkylene group may be 20 or less, 16 or less, 12 or less, or 8 or less. Also, here, the polymerizable functional group P' may be an acryloyl group, a methacryloyl group, an acryloyloxy group or a methacryloyloxy group. Here, when two neighboring substituents of $R_1$ to $R_5$ or two neighboring substituents of $R_6$ to $R_{10}$ are bonded to each other to constitute the benzene ring, the remaining substituents may be hydrogen, halogen, an alkyl group, an alkoxy group, an alkoxycarbonyl group, a cyano group or a nitro group, as described above.

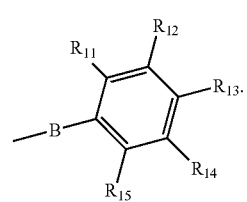
[Formula 7]

In Formula 7, B may be a single bond, —C(=O)O— or —OC(=O)—, and $R_{11}$ to $R_{15}$ may each independently be hydrogen, halogen, an alkyl group, an alkoxy group, an alkoxycarbonyl group, a cyano group, a nitro group or the -L-A-P, or two neighboring substituents of $R_{11}$ to $R_{15}$ may be bonded to each other to constitute a benzene ring substituted with -L-A-P. In this case, the structure of Formula 7 has a naphthalene structure substituted with -L-A-P. Here, when two neighboring substituents of $R_{11}$ to $R_{15}$ are bonded to each other to constitute the benzene ring, the remaining substituents may be hydrogen, halogen, an alkyl group, an alkoxy group, an alkoxycarbonyl group, a cyano group or a nitro group, as described above.

The meaning of the single bond in Formulas 6 and 7 is the same as the case of Formulas 1 to 5 above, and the meanings of the alkyl group and the alkoxy group are also the same as the case of Formulas 1 to 5 above.

In one example, as $R_2$ and $R_3$ or $R_3$ and $R_4$ in Formula 6 above form benzene substituted with the -L'-A'-P', a compound in which the left side of A in Formula 6 above forms a naphthalene structure can be used as the normal wavelength dispersion polymerizable liquid crystal compound.

As the normal wavelength dispersion polymerizable liquid crystal compound, a compound in which any one of $R_7$ to $R_9$ in Formula 6 above, for example, $R_8$ is Formula 7 above can also be used. In this case, as $R_{12}$ and $R_{13}$ or $R_{13}$ and $R_{14}$ in Formula 7 above form benzene substituted with the -L-A-P, a compound in which the right side of B in Formula 7 above forms a naphthalene structure can be used.

The ratio of the normal wavelength dispersion polymerizable liquid crystal compound in the cured layer (liquid crystal layer) is not particularly limited, as long as while the transmittance characteristic of the cured layer (liquid crystal layer) is maintained in the desired range, the optical properties such as the R (450)/R (550) value of the entire cured layer (liquid crystal layer) can be maintained in the desired range. For example, the normal wavelength dispersion polymerizable liquid crystal compound may be contained in a ratio of 60 wt % or less. In another example, the ratio may also be about 55 wt % or less, 50 wt % or less, 45 wt % or less, 40 wt % or less, 35 wt % or less, 30 wt % or less, 25 wt % or less, 20 wt % or less, 15 wt % or less, 10 wt % or less, or 5 wt % or less or so. The ratio may be 0 wt % or more, or may also be more than 0 wt %. Within this range, the cured layer (liquid crystal layer) can exhibit suitable reverse wavelength dispersion characteristics and transmittance characteristics. Therefore, the ratio of the normal wavelength dispersion polymerizable liquid crystal compound in the polymerizable liquid crystal composition may be within a range in which the normal wavelength dispersion polymerizable liquid crystal compound in the formed cured layer can be present in the above-mentioned range.

The cured layer (liquid crystal layer) may comprise polymerized units of a polymerizable liquid crystal compound having tri-functionality or more, for example, a polymerizable liquid crystal compound having 3 to 10, 3 to 8, 3 to 6, 3 to 5, 3 to 4, or 3 polymerizable functional groups. Such a polymerizable liquid crystal compound having tri-functionality or more may be the above-mentioned reverse wavelength dispersion or normal wavelength dispersion polymerizable liquid crystal compound. The ratio of polymerized units of the polymerizable liquid crystal compound in the cured layer (liquid crystal layer) is not particularly limited, but it may be, for example, 30 wt % or more, or 40 wt % or more and may be 100 wt % or less, or may be less than 100 wt %. The cured layer (liquid crystal layer) comprising polymerized units of the polymerizable liquid crystal compound having tri-functionality or more in such a ratio can exhibit excellent durability.

In the cured layer (liquid crystal layer) of the polymerizable liquid crystal composition comprising the polymerizable liquid crystal compound as described above, the conversion ratio of the polymerizable liquid crystal compound, that is, the ratio of the polymerizable liquid crystal compound converted from the initial monomer state into the polymerized state may be, for example, 50 wt % to 100 wt % or so. In another example, the conversion ratio may be about 60 to 100 wt % or about 70 to 100 wt % or so. At such a conversion ratio, the cured layer (liquid crystal layer) can exhibit excellent durability.

The retardation layer may exhibit specific ultraviolet absorbing ability through the application of the normal wavelength dispersion and reverse wavelength dispersion polymerizable liquid crystal compounds even in a state where the ultraviolet absorber or the light stabilizer is not applied.

The retardation layer may have an absolute value of the retardation change ratio according to the following Equation A of about 17% or less, about 16.5% or less, about 16% or less, or about 15.5% or less. In another example, the retardation change ratio may be about 0% or more, 2% or more, 4% or more, 6% or more, 8% or more, 10% or more, 12% or more, or 14% or more.

Retardation change ratio=100×(Ra−Ri)/Ri. [Equation A]

In Equation A, Ri is the initial in-plane retardation of the retardation layer for a wavelength of 550 nm, and Ra is the in-plane retardation of the retardation layer for a wavelength of 550 nm after an endurance condition.

Here, the endurance condition is to maintain the retardation layer at 85° C., and specifically, the retardation change ratio can be measured by the method disclosed in the following examples. Here, the holding time at the endurance condition may be 50 hours or more, 100 hours or more, 150 hours or more, 200 hours or more, or 250 hours or more. In another example, the holding time may also be about 300 hours or less or so.

The laminate film of the present application may have various structures while basically comprising the base film and the retardation layer.

For example, as illustrated in FIG. 2, the laminate film may have the base film (100) and the retardation layer (200) formed on one side thereof, and may further comprise an alignment film (300) between the base film (100) and the retardation layer (200).

As the alignment film, various kinds of liquid crystal alignment films known in the art can be applied without limitation. The alignment film may be a horizontal alignment film or a vertical alignment film, and may also be a so-called photoalignment film or rubbing alignment film. In the structure illustrated in FIG. 2, the alignment film (300) may be formed to be peelable from the base film (100), or may be formed to be peelable from the retardation layer (200). As such, the manner in which the alignment film (300) and/or the retardation layer (200) is formed to be peelable is not particularly limited, and the peelable alignment film (300) and/or retardation layer (200) may be formed in accordance with a so-called method of manufacturing a transfer film known in the art.

In addition, the laminate film may further comprise a vertically oriented liquid crystal layer having a polymerized unit of the vertically oriented polymerizable liquid crystal compound between the base film and the retardation layer or on the opposite side of the retardation film to the base film.

FIG. 3 illustrates a case where the vertically oriented liquid crystal layer (400) is formed between the retardation layer (200) and the base film (100), and FIG. 4 illustrates a case where the vertically oriented liquid crystal layer (400) is formed on the opposite side of the retardation layer (200) to the base film (100).

Such a vertically oriented liquid crystal layer may be formed to be particularly useful, for example, when the retardation layer is a horizontally oriented liquid crystal layer and the laminate film is applied to a polarizing plate for antireflection in an organic light emitting device. By applying the vertically oriented liquid crystal layer, display image quality such as antireflection characteristics and color senses at a tilt angle may be improved.

The vertically oriented liquid crystal layer may be a layer that satisfies the refractive index relationship of Equation 7 or 8 below:

$$nx=ny<nz;\qquad\text{[Equation 7]}$$

$$nx>ny \text{ and } nz>ny.\qquad\text{[Equation 8]}$$

In Equations 7 and 8 above, nx, ny, and nz are the same as defined in Equation 1 to 3 above.

The vertically oriented liquid crystal layer may have thickness direction retardation in a range of 10 to 400 nm. In another example, the thickness direction retardation may be 370 nm or less, 350 nm or less, 330 nm or less, 300 nm or less, 270 nm or less, 250 nm or less, 240 nm or less, 230 nm or less, 220 nm or less, 200 nm or less, 190 nm or less, 180 nm or less, 170 nm or less, 160 nm or less, 155 nm or less, 150 nm or less, 130 nm or less, 120 nm or less, 110 nm or less, 100 nm or less, 80 nm or less, or 70 nm or less. Also, in another example, the thickness direction retardation may be 5 nm or more, 10 nm or more, 20 nm or more, 40 nm or more, 50 nm or more, 90 nm or more, 100 nm or more, 110 nm or more, 120 nm or more, or 150 nm or more. It is possible to provide a circularly polarizing plate having excellent reflection characteristics and visual appreciation characteristics, in particular, reflection characteristics and visual appreciation characteristics at a tilt angle, by adjusting the thickness direction retardation of the vertically oriented liquid crystal layer as above.

When the vertically oriented liquid crystal layer satisfies Equation 8 above, the in-plane retardation thereof may be more than 0 nm, and may be, for example, 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 10 nm or less.

When the vertically oriented liquid crystal layer satisfies Equation 8 above, its slow axis may be arranged to form any angle in a range of approximately 40 degrees to 60 degrees with the slow axis of the retardation layer. In another example, the angle may be 35 degrees or more, or 40 degrees or more, and may also be 55 degrees or less, or 50 degrees or less.

The vertically oriented liquid crystal layer exhibiting such characteristics may be manufactured in various ways known in the art. For example, the vertically oriented liquid crystal layer may be formed by polymerizing the above-described polymerizable liquid crystal compound in a vertically oriented state.

At this time, there is no limitation on the kind of the polymerizable liquid crystal compound which can be applied, and a kind known in the art can be applied.

The vertically oriented liquid crystal layer may have a characteristic that satisfies Equation 9 below:

$$Rth(450)/Rth(550)<Rth(650)/Rth(550).\qquad\text{[Equation 9]}$$

In Equation 9, Rth (450) is the thickness direction retardation of the liquid crystal layer for light having a wavelength of 450 nm, Rth (550) is the thickness direction retardation of the liquid crystal layer for light having a wavelength of 550 nm, and Rth (650) is the thickness direction retardation of the liquid crystal layer for light having a wavelength of 650 nm.

The thickness direction retardation may each be calculated according to Equation 5 as described above. However, the values of nz and ny applied in Equation 5 in the calculation of the thickness direction retardation are refractive indexes for light having a wavelength of 450 nm; as the values of nz and ny applied in Equation 5 in the calculation of the thickness direction retardation are refractive indexes for light having a wavelength of 550 nm; and as the values of nz and ny applied in Equation 5 in the calculation of the thickness direction retardation are refractive indexes for light having a wavelength of 650 nm.

The liquid crystal layer satisfying Equation 9 may exhibit phase delay characteristics designed in a wide wavelength range.

The liquid crystal layer satisfying Equation 9 may be formed by polymerizing the reverse wavelength dispersion polymerizable liquid crystal compound, or the reverse wavelength dispersion polymerizable liquid crystal compound and the normal wavelength dispersion polymerizable liquid crystal compound, as described above, in a vertically oriented state.

When the vertically oriented liquid crystal layer is included, the laminate film may further comprise a vertical alignment film.

For example, when the retardation layer is a horizontally oriented liquid crystal layer that is a layer comprising a polymerized unit of the horizontally oriented polymerizable liquid crystal compound, the laminate film may further comprise a horizontal alignment film and a vertical alignment film, and may comprise the base film, the horizontal alignment film, the retardation layer (horizontally oriented liquid crystal layer), the vertical alignment film and the vertically oriented liquid crystal layer in this order.

For example, when the retardation layer is a horizontally oriented liquid crystal layer that is a layer comprising a polymerized unit of the horizontally oriented polymerizable liquid crystal compound, the laminate film may further comprise a horizontal alignment film and a vertical alignment film, and may comprise the base film, the vertical alignment film, the vertically oriented liquid crystal layer, the horizontal alignment film and the retardation layer (horizontally oriented liquid crystal layer) in this order.

There is no particular limitation on the kind of the alignment film which can be applied in this structure, and a known alignment film can be applied suitably.

The laminate film may be configured to be applied to a display device together with a base film, or may be formed in the form of a so-called transfer film. In this case, the base film may be formed to be peeled from the retardation layer. For example, when an alignment film (vertical and/or horizontal alignment film) exists between the retardation layer and the base film, the laminate film may be configured such that the base film is peeled from the alignment film, or the base film is peeled from the retardation layer together with the alignment film. The manner of configuring the laminate film in this manner is not particularly limited, and a known method of implementing a transfer film may be applied.

The laminate film may comprise various additional layers in addition to the above-described components. The additional layers may be exemplified by a polarizer, a polarizer protective film, an alignment film, a release layer, a hard coating layer, a retardation film, an antireflection layer or a liquid crystal layer, and the like, but is not limited thereto. The specific kind of each layer is not particularly limited, and for example, various kinds used in the art to form a laminate film having desired optical functions may be used without limitation.

The present application is also directed to a display device. An exemplary display device may comprise the laminate film.

The specific kind of the display device comprising the laminate film is not particularly limited. The device may be, for example, a liquid crystal display such as a reflective type or semi-transmissive reflective type liquid crystal display, or may be an organic light emitting device or the like.

The arrangement type of the laminate film in the display device is not particularly limited, and for example, a known type may be adopted. For example, in a reflective type liquid crystal display, the laminate film can be used to configure any one circularly polarizing plate among the circularly polarizing plates of a liquid crystal panel for preventing reflection of external light and ensuring visibility.

When the laminate film is applied to the organic light emitting device, the organic light emitting device comprises a reflective electrode, a transparent electrode, an organic layer interposed between the reflective electrode and the transparent electrode and having a light emitting layer, and the laminate film, where the laminate film may be present outside the reflective or transparent electrode.

The present application can provide a laminate film comprising a retardation layer exhibiting blocking characteristics against specific ultraviolet rays even in a state where the retardation layer does not include any ultraviolet absorber or light stabilizer. In addition, the present application can provide a laminate film which can be used alone or in combination with an appropriate sunscreen or a light stabilizer as needed to selectively block ultraviolet rays in a region requiring blocking, without affecting display performance, such as color senses and image quality, of a display device, can also be formed thinly without requiring a separate ultraviolet blocking layer, and also has excellent durability, because the laminate film exhibits a certain ultraviolet blocking property even in the absence of an ultraviolet absorber or light stabilizer.

Hereinafter, the present application will be described in detail by way of examples and comparative examples, but the scope of the present application is not limited by the following transmittance-variable device.

Preparation Example 1. Preparation of Polymerizable Liquid Crystal Composition A A polymerizable liquid crystal composition was prepared using LC1057 liquid crystals of BASF Corporation as a normal wavelength dispersion polymerizable liquid crystal compound and a liquid crystal compound of Formula A below as a reverse wavelength dispersion liquid crystal compound. The normal wavelength dispersion polymerizable liquid crystal compound has R (450)/R (550) in a level of about 1.09 to 1.11 or so and R (650)/R (550) in a level of about 0.93 to 0.95 or so, and the liquid crystal compound of Formula A has R (450)/R (550) in a level of about 0.84 to 0.86 or so and R (650)/R (550) in a level of about 1.01 to 1.03 or so. The R (450), R (550) and R (650) are in-plane retardation for light having wavelengths of 450 nm, 550 nm and 650 nm, respectively, as measured with respect to a retardation layer formed by using the normal wavelength dispersion polymerizable liquid crystal compound or the polymerizable liquid crystal compound of Formula A alone. The in-plane retardation can be measured by a known method, and for example, it can be measured by a polarization measurement method using Axoscan (Axometrics), which is a birefringence meter. The method of forming the retardation layer by using the polymerizable liquid crystal compounds alone is the same as that described in the following examples, except that the polymerizable liquid crystal compounds are applied alone. The normal wavelength dispersion polymerizable liquid crystal compound and the reverse wavelength dispersion polymerizable liquid crystal compound of Formula A were mixed in a weight ratio of approximately 94:6 to 95:5 (reverse wavelength dispersion polymerizable liquid crystal: normal wavelength dispersion polymerizable liquid crystal) and about 5 parts by weight of a radical photoinitiator (BASF, Irgacure 907) relative to 100 parts by weight of the total of the polymerizable liquid crystal compounds was combined in a solvent (cyclopentanone) to prepare a polymerizable liquid crystal composition A.

[Formula A]

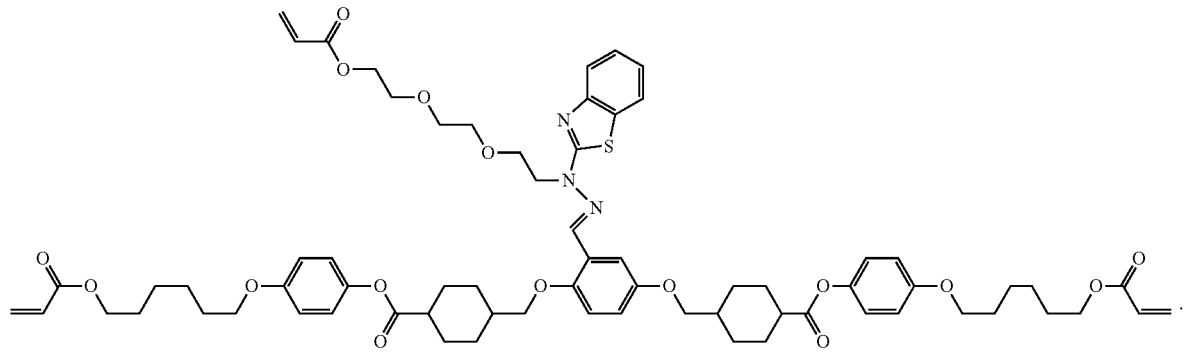

Here, the compound of Formula A was synthesized in the following manner. Under a nitrogen atmosphere, 17.7 g of a compound of Formula A1 below and 100 ml of tetrahydrofuran were placed in a reaction vessel. 103 ml of a 0.9 mol/L borane-tetrahydrofuran complex was dripped while cooling with ice and the mixture was stirred for 1 hour. After dripping 5% hydrochloric acid, the mixture was extracted with ethyl acetate and washed with a saline solution. The extract was dried over sodium sulfate and the solvent was distilled off to obtain 14.9 g of a compound represented by Formula A2 below. Under a nitrogen atmosphere, 14.9 g of the compound represented by Formula A2, 7.2 g of pyridine and 150 ml of dichloromethane were added to the reaction vessel. 8.8 g of methanesulfonyl chloride was dripped while cooling with ice and the mixture was stirred at room temperature for 3 hours. The reactant was poured into water, and washed sequentially with 5% hydrochloric acid and a saline solution. Purification was performed by column chromatography (silica gel, hexane/ethyl acetate) and recrystallization (acetone/hexane) to obtain 16.3 g of a compound represented by Formula A3 (in Formula A3 below, Ms is a methanesulfonyl group). Under a nitrogen atmosphere, 2.5 g of a compound represented by Formula A4, 10.6 g of the compound represented by Formula A3, 7.5 g of potassium carbonate and 70 ml of N,N-dimethylformamide were added to the reaction vessel and the mixture was heated and stirred at 90° C. for 3 days. The reactant was poured into water, extracted with toluene and washed with a saline solution. Purification was performed by column chromatography (silica gel, toluene) and recrystallization (acetone/methanol) to obtain 7.7 g of a compound represented by Formula A5. 7.7 g of the compound represented by Formula A5, 150 ml of dichloromethane and 100 ml of trifluoroacetic acid were added to the reaction vessel and stirred. After the solvent was distilled off, the resulting solid was washed with water and dried to obtain 5.5 g of a compound represented by Formula A6.

Under a nitrogen atmosphere, 5.5 g of the compound represented by Formula A6, 6.9 g of a compound represented by Formula A7, 0.8 g of N,N-dimethylaminopyridine and 200 ml of dichloromethane were added to the reaction vessel. 4.1 g of diisopropylcarbodiimide was dripped while cooling with ice and the mixture was stirred at room temperature for 10 hours. After the precipitate was removed by filtration, the filtrate was washed successively with 1% hydrochloric acid, water and a saline solution. After performing recrystallization (dichloromethane/methanol), purification was performed by column chromatography (silica gel, dichloromethane) and recrystallization (dichloromethane/methanol) to obtain 8.4 g of a compound represented by Formula A8.

1.4 g of the compound represented by Formula A8, 0.35 g of 2-hydrazinobenzothiazole and 5 ml of tetrahydrofuran were added to a 30 ml three-necked flask, and the mixture was stirred at 25° C. for 9 hours. Then, 50 ml of water was added, and the mixture was extracted twice with 30 ml of ethyl acetate. The resulting organic phase was dried with sodium sulfate. After sodium sulfate was filtered off, the organic phase was concentrated under reduced pressure. The resulting residue was purified by silica gel column chromatography (hexane/ethyl acetate=2/1). The resulting crude product was subjected to re-precipitation using acetone/methanol. These crystals were filtered and dried to obtain 0.98 g of a compound represented by Formula A9. Subsequently, the hydrogen atom attached to the nitrogen atom of the compound represented by Formula A9 was substituted with a 2-[2-(2-acryloyloxyethoxy)ethoxylethyl group to obtain the compound represented by Formula A. NMR confirmatory results of the resulting compound of Formula A were described below.

[Formula A1]

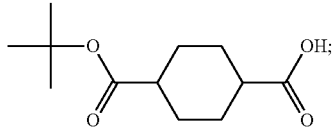

[Formula A2]

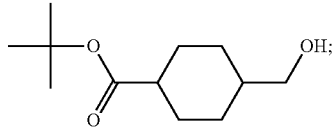

[Formula A3]

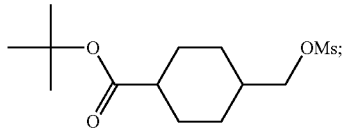

[Formula A4]

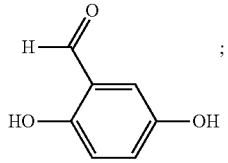

[Formula A5]

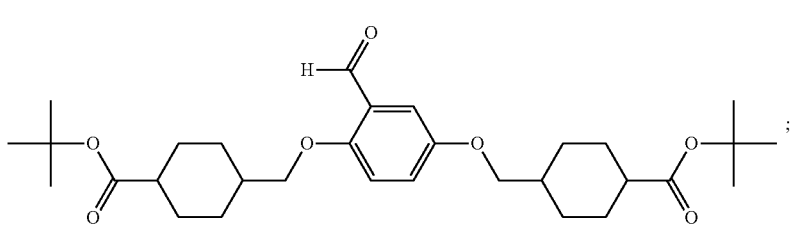

[Formula A6]

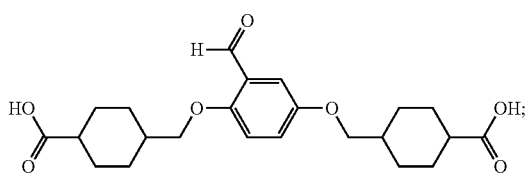

[Formula A7]

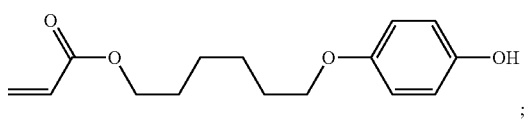

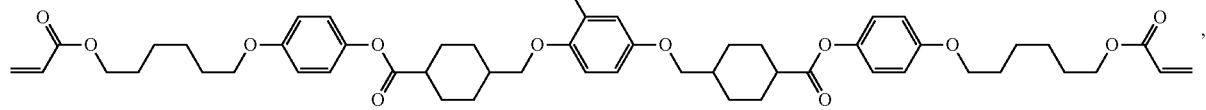

[Formula A8]

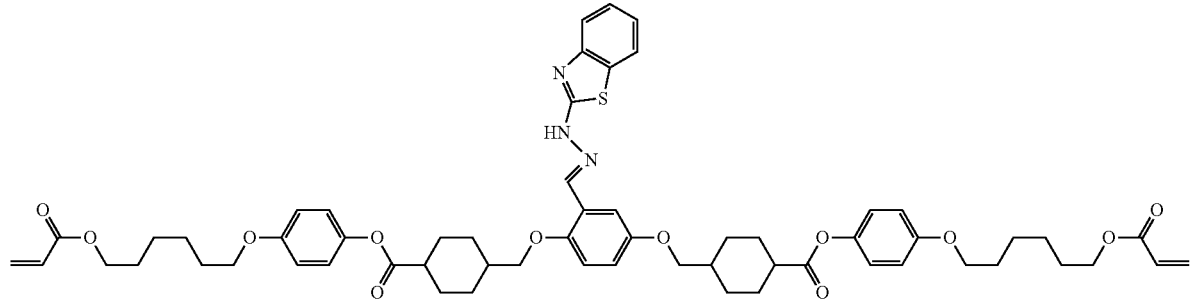

[Formula A9]

<NMR Results>
$^1$H NMR (CDCl$_3$) δ 1.19-1.29 (m, 4H), 1.41-1.82 (m, 22H), 1.91 (m, 2H), 2.08 (m, 4H), 2.24 (m, 4H), 2.53 (m, 2H), 3.62 (m, 3H), 3.67 (m, 2H), 3.84-3.90 (m, 5H), 3.94 (t, 4H), 4.15-4.19 (m, 6H), 4.53 (t, 2H), 5.76 (dd, 1H), 5.82 (dd, 2H), 6.08 (dd, 1H), 6.12 (dd, 2H), 6.37 (dd, 1H), 6.40 (dd, 2H), 6.84-6.90 (m, 6H), 6.95-6.98 (m, 4H), 7.14 (t, 1H), 7.32 (t, 1H), 7.53 (d, 1H), 7.65 (d, 1H), 7.69 (d, 1H), 8.34 (s, 1H) ppm.

Preparation Example 2. Preparation of Polymerizable Liquid Crystal Composition B A polymerizable liquid crystal composition B was prepared in the same manner as in Preparation Example 1, except that a liquid crystal compound of Formula B below was applied as the reverse wavelength dispersion polymerizable liquid crystal compound. The liquid crystal compound of Formula B has R (450)/R (550) in a level of about 0.81 to 0.83 or so and R (650)/R (550) in a level of about 1.01 to 1.03 or so. The R (450), R (550) and R (650) are in-plane retardation for light having wavelengths of 450 nm, 550 nm and 650 nm, as measured with respect to a retardation layer formed by using the polymerizable liquid crystal compound of Formula B alone.

Here, the compound of the Formula B was obtained by obtaining a compound represented by Formula A9 below in the same manner as in Preparation Example 1 and then substituting the hydrogen atom attached to the nitrogen atom of the compound represented by Formula A9 with a 2-[2-(methoxyethoxy)]ethyl group. NMR confirmatory results of the resulting compound of Formula B were described below.

<NMR Results>
$^1$H NMR (CDCl$_3$) δ4H), 1.44-1.47 (m, 8H), 1.60-1.82 (m, 12H), 1.90 (m, 2H), 2.07 (t, 4H), 2.24 (d, 4H), 2.53 (m, 2H), 3.30 (s, 3H), 3.50 (t, 2H), 3.66 (t, 2H), 3.85-3.89 (m, 6H), 3.93 (t, 4H), 4.17 (t, 4H), 4.53 (t, 2H), 5.82 (d, 2H), 6.13 (q, 2H), 6.40 (d, 2H), 6.83-6.90 (m, 6H), 6.95-6.98 (m, 4H), 7.14 (t, 1H), 7.32 (t, 1H), 7.52 (t, 1H), 7.67 (t, 2H), 8.33 (s, 1H) ppm.

Preparation Example 3. Preparation of Polymerizable Liquid Crystal Composition C A polymerizable liquid crystal composition was prepared by applying the reverse wavelength dispersion polymerizable liquid crystal compound of Formula A in Preparation Example 1 above, the same photoinitiator as that used in Preparation Example 1 and an ultraviolet absorber (Orient Chemical Industries, BONASORB UA-3912) having a maximum absorption wavelength range of about 380 to 390 nm as an ultraviolet absorber. The reverse wavelength dispersion polymerizable liquid crystal compound of Formula A, the photoinitiator and the ultraviolet absorber were combined in a solvent (cyclopentanone) in a weight ratio of 20:1:1 (reverse wavelength dispersion polymerizable liquid

[Formula B]

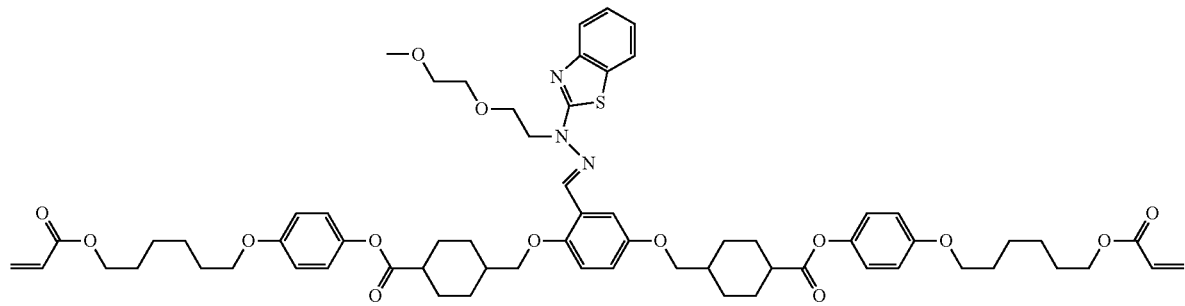

crystal compound: photoinitiator: ultraviolet absorber) to prepare a polymerizable liquid crystal composition C.

Preparation Example 4. Preparation of Polymerizable Liquid Crystal Composition D A polymerizable liquid crystal composition D was prepared in the same manner as in the case of Preparation Example 3, except that the reverse wavelength dispersion polymerizable liquid crystal compound of Formula A, the photoinitiator and the ultraviolet absorber were combined in a weight ratio of 20:1:0.6 (reverse wavelength dispersion polymerizable liquid crystal compound: photoinitiator: ultraviolet absorber).

Example 1

A photo-alignment film was formed on Fuji Film's NRT (no retardation TAC (triacetyl cellulose)) base film. A known cinnamate series composition for forming a photo-alignment film was applied on the NRT base film to a thickness of about 100 nm or so and irradiated with linearly polarized ultraviolet rays at about 300 mW/cm$^2$ to form the alignment film. Subsequently, the polymerizable liquid crystal composition A was applied on the photo-alignment film so as to have a dry thickness of about 1 μm or so, oriented along the lower alignment film, and then irradiated with ultraviolet rays at about 300 mW/cm$^2$ for about 10 seconds to form a retardation layer. The in-plane retardation of the retardation layer for light having a wavelength of 550 nm was about 146.0 nm or so. The formed retardation layer had R (450)/R (550) in a level of about 0.85 to 0.87 or so and R (650)/R (550) in a level of about 1.01 to 1.05 or so.

Example 2

A retardation layer was formed in the same manner as in Example 1, except that the polymerizable liquid crystal composition B was applied instead of the polymerizable liquid crystal composition A. The in-plane retardation of the retardation layer for light having a wavelength of 550 nm was about 144.5 nm. The formed retardation layer had R (450)/R (550) in a level of about 0.82 to 0.85 or so and R (650)/R (550) in a level of about 1.01 to 1.05 or so.

Comparative Example 1

A retardation layer was formed in the same manner as in Example 1, except that the polymerizable liquid crystal composition C was applied instead of the polymerizable liquid crystal composition A. The in-plane retardation of the retardation layer for light having a wavelength of 550 nm was about 131.7 nm. The formed retardation layer had R (450)/R (550) in a level of about 0.84 to 0.86 or so and R (650)/R (550) in a level of about 1.01 to 1.03 or so.

Comparative Example 2

A retardation layer was formed in the same manner as in Example 1, except that the polymerizable liquid crystal composition D was applied instead of the polymerizable liquid crystal composition A. The in-plane retardation of the retardation layer for light having a wavelength of 550 nm was about 140.7 nm. The formed retardation layer had R (450)/R (550) in a level of about 0.81 to 0.83 or so and R (650)/R (550) in a level of about 1.01 to 1.03 or so.

Evaluation 1. Comparison of Ultraviolet Absorption Characteristics

The ultraviolet absorption characteristics of each of the retardation layers produced in Examples and Comparative Examples were compared. The ultraviolet absorption characteristics for each wavelength were evaluated for a specimen that an alignment film and a liquid crystal layer (retardation layer) were sequentially formed on an NRT film (transmittance for 385 nm: 90.8%, transmittance for 390 nm: 91.1%, transmittance for 395 nm: 91.2% or transmittance for 400 nm: 91.4%) base material which did not exhibit any absorption peak in a wavelength region of 300 nm or more by a method shown in each of Examples and Comparative Examples by using N&K UV Spectrometer (HP). FIGS. 5 and 6 are measurement results for Examples 1 and 2, respectively, and FIGS. 7 and 8 are measurement results for Comparative Examples 1 and 2, respectively. The specific transmittance for each wavelength was summarized in Table 1 below.

TABLE 1

|  | Transmittance (unit: %) | | | |
| --- | --- | --- | --- | --- |
|  | 385 nm | 390 nm | 395 nm | 400 nm |
| Example 1 | 1.7 | 3.7 | 10.4 | 27.0 |
| Example 2 | 1.7 | 3.8 | 10.5 | 27.2 |
| Comparative Example 1 | 0.5 | 0.9 | 2.6 | 7.0 |
| Comparative Example 2 | 0.7 | 1.6 | 4.3 | 11.6 |

From Table 1, it can be confirmed that the present application can secure superior ultraviolet blocking properties without applying an ultraviolet absorber.

Evaluation 2. Durability Evaluation

Durability was evaluated for each of the retardation layers produced in Examples and Comparative Examples. The durability was evaluated by maintaining each of the retardation layers produced in Examples and Comparative Examples at a condition of about 85° C. (endurance condition) for 250 hours, and then comparing the in-plane retardation (based on a wavelength of 550 nm) before maintaining the condition and the in-plane retardation (based on a wavelength of 550 nm) after maintaining the condition. FIGS. 9 and 10 are measurement results for Examples 1 and 2, respectively and FIGS. 11 and 12 are measurement results for Comparative Examples 1 and 2, respectively.

TABLE 2

|  | In-plane retardation (based on a wavelength of 550 nm) | | |
| --- | --- | --- | --- |
|  | Before maintaining endurance condition | After maintaining endurance condition | Change amount |
| Example 1 | 146.0 nm | 123.8 nm | −15.2% |
| Example 2 | 144.5 nm | 123.8 nm | −14.8% |
| Comparative Example 1 | 131.7 nm | 101.7 nm | −22.8% |
| Comparative Example 2 | 140.7 nm | 113.6 nm | −19.3% |

From the results of Table 2, in the case of the retardation layer according to the present application, it can be confirmed that it has excellent ultraviolet absorbing ability without using an ultraviolet absorber or a light stabilizer and also as a result, shows excellent results in terms of durability.

The invention claimed is:

1. A laminate film comprising a base film; and a retardation layer formed on one side of the base film,
   wherein the retardation layer has a quarter-wave phase delay characteristics, and comprises a polymerized unit of a normal wavelength dispersion polymerizable liquid crystal compound and a polymerized unit of a reverse wavelength dispersion polymerizable liquid crystal compound,
   wherein the retardation layer comprises neither an ultraviolet absorber nor a light stabilizer, and
   wherein the retardation layer has an ultraviolet absorptivity such that a transmittance of light having a wavelength of 385 nm through the retardation layer is 3% or less, a transmittance of light having a wavelength of 390 nm through the retardation layer is greater than 3% and less than 10%, and a transmittance of light having a wavelength of 395 nm through the retardation layer is greater than or equal to 10% and less than 25%; and
   wherein the reverse wavelength dispersion polymerizable liquid crystal compound is represented by Formula 1 below:

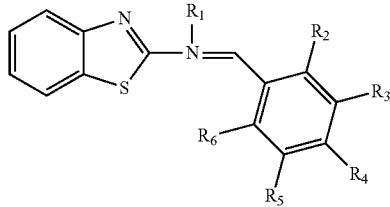

[Formula 1]

wherein in Formula 1, $R_1$ is a substituent of Formula 2 or 3 below, and $R_2$ to $R_6$ are each independently hydrogen, an alkyl group, an alkoxy group, a cyano group, a substituent of Formula 4 below or a substituent of Formula 5 below, wherein at least two of $R_2$ to $R_6$ are substituents of Formula 4 below or substituents of Formula 5 below, -$A_1$-$L_1$-Cyc-$A_2$-$L_2$-P    [Formula 2]

wherein, in Formula 2, $A_1$ and $A_2$ are each independently an oxygen atom or a single bond, $L_1$ and $L_2$ are each independently —C(=O)—O—, —O—C(=O)— or an alkylene group, Cyc is an arylene group or a cycloalkylene group, and P is an acryloyl group, a methacryloyl group, an acryloyloxy group or a methacryloyloxy group, —$L_3$—(O—$L_4$)$_n$—P,    [Formula 3]

wherein, in Formula 3, $L_3$ and $L_4$ are each an alkylene group, n is a number in a range of 1 to 4, and P is an acryloyl group, a methacryloyl group, an acryloyloxy group, a methacryloyloxy group or a hydrogen atom, -$A_3$-$L_5$-Cyc-$A_4$-$L_6$-P    [Formula 4]

wherein in Formula 4, $A_3$ and $A_4$ are an oxygen atom, an alkylene group or a single bond, $L_5$ and $L_6$ are each independently —C(=O)—O—, —O—C(=O)— or an alkylene group, Cyc is an arylene group, and P is an acryloyl group, a methacryloyl group, an acryloyloxy group or a methacryloyloxy group, -$A_5$-$L_7$-$Cy_1$-$A_6$-$L_8$-$Cy_2$-$A_7$-$L_9$-P    [Formula 5]

wherein in Formula 5, $A_5$, $A_6$ and $A_7$ are each independently an oxygen atom or a single bond, $L_7$, $L_8$ and $L_9$ are each independently —C(=O)—O—, —O—C(=O)— or an alkylene group, $Cy_1$ is a cycloalkylene group, $Cy_2$ is an arylene group, and P is an acryloyl group, a methacryloyl group, an acryloyloxy group or a methacryloyloxy group,
   wherein the reverse wavelength dispersion polymerizable liquid crystal compound includes a reverse wavelength dispersion polymerizable liquid crystal compound having tri-functionality or more; and
   wherein the normal wavelength dispersion polymerizable liquid crystal compound is represented by Formula 6 below:

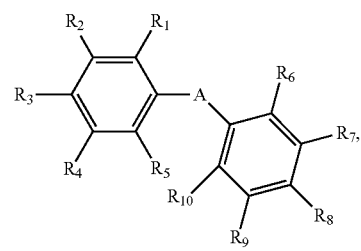

[Formula 6]

wherein in Formula 6, A is a single bond, —C(=O)O— or —OC(=O)— and $R_1$ to $R_{10}$ are each independently hydrogen, halogen, an alkyl group, an alkoxy group, an alkoxycarbonyl group, a cyano group, a nitro group or a substituent of Formual 7 below, or two neighboring substituents selected from $R_1$ to $R_5$, or two neighboring substituents selected from $R_6$ to $R_{10}$, are bonded to each other to constitute a benzene ring substituted with an -L'-A'-P' group, wherein in the -L'-A'-P' group, L' is —C(=O)O—, —OC(=O)— or —OC(=O)O—, A' is an alkylene group and P' is an acryloyl group, a methacryloyl group, an acryloyloxy group or a methacryloyloxy group,

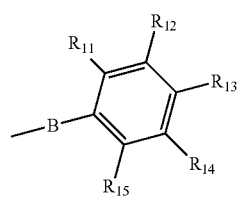

[Formula 7]

wherein in Formula 7, B is a single bond, —C(=O)O— or —OC(=O)— and $R_{11}$ to $R_{15}$ are each independently hydrogen, halogen, an alkyl group, an alkoxy group, an alkoxycarbonyl group, a cyano group, a nitro group or an -L-A-P group, or two neighboring substituents of $R_{11}$ to $R_{15}$ are bonded to each other to constitute a benzene ring substituted with an -L-A-P group, wherein in the -L-A-P group, L is —C(=O)O—, —OC(=O)— or —OC(=O)O—, A is an alkylene group and P is an acryloyl group, a methacryloyl group, an acryloyloxy group or a methacryloyloxy group.

2. The laminate film according to claim 1, wherein the retardation layer has an absolute value of a retardation change ratio according to Equation A below of 17% or less:

Retardation change ratio=100×(Ra−Ri)/Ri, [Equation A]

wherein in Equation A, Ri is an initial in-plane retardation of the retardation layer for a wavelength of 550 nm, and Ra is an in-plane retardation of the retardation layer for a wavelength of 550 nm after an endurance condition, and wherein the endurance condition includes the retardation layer standing at a temperature of 85° C. for 50 hours or more.

3. The laminate film according to claim 1, wherein a transmittance of light having a wavelength of 400 nm through the retardation layer is 40% or less.

4. The laminate film according to claim 1, further comprising a vertically oriented liquid crystal layer having a polymerized unit of a vertically oriented polymerizable liquid crystal compound between the base film and the retardation layer, or on a side of the base film opposite to the retardation layer.

5. The laminate film according to claim 4, further comprising a horizontal alignment film and a vertical alignment film, wherein the base film, the horizontal alignment film, the retardation layer, the vertical alignment film and the vertically oriented liquid crystal layer are disposed in this order.

6. The laminate film according to claim 4, further comprising a horizontal alignment film and a vertical alignment film, wherein the base film, the vertical alignment film, the vertically oriented liquid crystal layer, the horizontal alignment film and the retardation layer are disposed in this order.

7. The laminate film according to claim 4, wherein the vertically oriented liquid crystal layer satisfies Equation 9 below:

$Rth(450)/Rth(550) < Rth(650)/Rth(550),$ [Equation 9]

wherein in Equation 9, Rth (450) is a thickness direction retardation of the vertically oriented liquid crystal layer for light having a wavelength of 450 nm, Rth (550) is a thickness direction retardation of the vertically oriented liquid crystal layer for light having a wavelength of 550 nm, and Rth (650) is a thickness direction retardation of the vertically oriented liquid crystal layer for light having a wavelength of 650 nm.

8. The laminate film according to claim 1, wherein the retardation layer comprises 30 wt % or more of the polymerized unit of the normal dispersion polymerizable liquid crystal compound and the polymerized unit of the reverse dispersion polymerizable liquid crystal compound having tri-functionality or more based on the total amount of the polymerized unit of the normal dispersion polymerizable liquid crystal compound and the polymerized unit of the reverse dispersion polymerizable liquid crystal compound.

9. The laminate film according to claim 1, wherein the base film is formed so as to be peeled from the retardation layer.

10. A display device comprising the laminate film of claim 1.

* * * * *